(12) United States Patent
Moore

(10) Patent No.: US 7,706,743 B1
(45) Date of Patent: Apr. 27, 2010

(54) LOW POWER RADIO DEVICE FOR PROVIDING ACCESS TO AIRCRAFT COMMUNICATIONS (OR OTHER SPECIALIZED COMMUNICATIONS) TO THE GENERAL PUBLIC VIA COMMERCIAL RADIO BANDS AND RECEIVERS

(76) Inventor: Michael David Moore, 41 Bruce Dr., Alplaus, NY (US) 12008

( * ) Notice: Subject to any disclaimer, the term of this patent is extended or adjusted under 35 U.S.C. 154(b) by 827 days.

(21) Appl. No.: 11/602,585

(22) Filed: Nov. 21, 2006

Related U.S. Application Data

(60) Provisional application No. 60/738,519, filed on Nov. 21, 2005.

(51) Int. Cl.
*H04Q 7/32* (2006.01)

(52) U.S. Cl. .......... 455/7; 455/11.1; 455/12.1; 455/431; 455/430; 455/426.1; 370/310; 370/315; 370/316; 370/318; 342/33; 342/34

(58) Field of Classification Search .......... 455/7, 455/11.1, 12.1, 24, 23, 25, 422.1, 403, 550.1, 455/500, 517, 431, 430, 514, 426.1, 426.2, 455/552.1, 553.1; 370/274, 310, 315, 316, 370/318; 342/33, 34
See application file for complete search history.

(56) References Cited

U.S. PATENT DOCUMENTS

| | | | |
|---|---|---|---|
| 4,214,205 A | 7/1980 | Guest | |
| 4,232,392 A | 11/1980 | French | |
| 4,318,076 A * | 3/1982 | Whitfield | 340/947 |
| 4,353,127 A | 10/1982 | Richardson | |
| 4,363,129 A * | 12/1982 | Cohn et al. | 455/17 |
| 4,541,119 A | 9/1985 | Cooper et al. | |
| 4,549,047 A | 10/1985 | Brian et al. | |
| 4,701,797 A | 10/1987 | Ferreira | |
| 4,905,303 A | 2/1990 | Johnson, Jr. et al. | |
| 5,038,402 A | 8/1991 | Robbins | |
| 5,173,775 A | 12/1992 | Walker | |
| 5,263,196 A | 11/1993 | Jasper | |
| 5,265,024 A | 11/1993 | Crabill et al. | |
| 5,418,577 A | 5/1995 | Bagley | |
| 5,434,546 A | 7/1995 | Palmer | |
| 5,434,565 A | 7/1995 | Simon et al. | |
| 5,444,433 A | 8/1995 | Gropper | |
| 5,508,731 A | 4/1996 | Kohorn | |
| 5,628,056 A | 5/1997 | Grysiewicz et al. | |
| 5,633,872 A * | 5/1997 | Dinkins | 370/312 |
| 5,726,786 A | 3/1998 | Heflinger | |
| 5,784,028 A | 7/1998 | Corman et al. | |
| 5,812,086 A | 9/1998 | Bertiger et al. | |
| 5,867,794 A | 2/1999 | Hayes et al. | |
| 5,915,210 A | 6/1999 | Cameron et al. | |
| 6,005,864 A | 12/1999 | Krause | |
| 6,151,308 A | 11/2000 | Ibanez-Meier et al. | |
| 6,249,913 B1 | 6/2001 | Galipeau et al. | |
| 6,351,500 B2 | 2/2002 | Kumar | |
| 6,510,207 B1 | 1/2003 | Cannon et al. | |
| 6,609,039 B1 | 8/2003 | Schoen | |
| 6,650,898 B2 | 11/2003 | Jochim et al. | |

(Continued)

*Primary Examiner*—Keith T Ferguson

(57) ABSTRACT

One embodiment of a radio device, in which a specialized receiver and antenna (10 and 11), an input mechanism (14), a storage area (12), a timer/multiplexer (16) and timer/multiplexer switch (17), control signals (13, 15, 18, and 19), low power transmitter (20) and low power transmitter antenna (21), under FCC Part 15 low power transmitter rules, provide aircraft communications to the general public on commercial AM and FM bands.

3 Claims, 7 Drawing Sheets

U.S. PATENT DOCUMENTS

Figure 1:
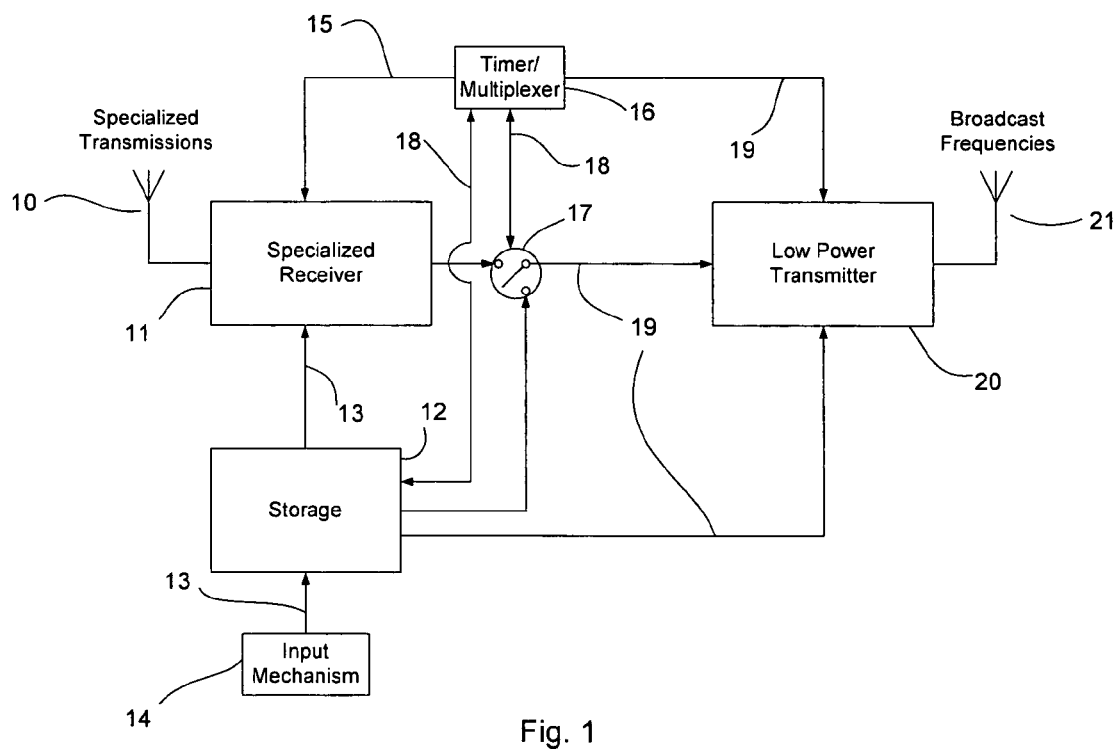

| | | |
|---|---|---|
| 6,725,035 B2 | 4/2004 | Jochim et al. |
| 6,813,485 B2 | 11/2004 | Sorrells et al. |
| 6,836,650 B2 | 12/2004 | Sorrells et al. |
| 6,879,838 B2 | 4/2005 | Rankin et al. |
| 2005/0076219 A1 | 4/2005 | De Bot |

* cited by examiner

LOW POWER RADIO DEVICE FOR PROVIDING ACCESS TO AIRCRAFT COMMUNICATIONS (OR OTHER SPECIALIZED COMMUNICATIONS) TO THE GENERAL PUBLIC VIA COMMERCIAL RADIO BANDS AND RECEIVERS

CROSS-REFERENCE TO RELATED APPLICATIONS

This application claims the benefit of provisional patent application No. 60/738,519, filed 2005 Nov. 21 by the present inventor.

FEDERALLY SPONSORED RESEARCH

Not Applicable

SEQUENCE LISTING OR PROGRAM

Not Applicable

BACKGROUND

1. Field of Invention

This invention relates to low power broadcasting under FCC Part 15 Rules, specifically to leveraging low power commercial (AM and FM) band re-broadcasting of specialized frequencies outside commercial bands (such as aircraft communications) using single or multiple distributed low power transmitters with overlapping areas of coverage.

2. Prior Art

Individuals viewing airport operations are unable to listen to the aircraft and traffic control communications that would make observation more informative and enjoyable; since these communications occur at frequencies 108-136 MHz which are well out of range of personal and car radios. The inability to easily listen to such communications is a roadblock to participation in General Aviation and presents a barrier, perceived and unperceived, that aviation in general is expensive and exclusive.

In order to overcome this barrier, the interested individual must first a) obtain the proper (and relatively costly) specialized receiver and then b) be educated in the frequencies of operation at the given airport. An alternative to circumvent this barrier is a capability that will receive and re-broadcast such aircraft communications on readily accessible commercial (AM and FM) bands.

Receiving followed by retransmitting has taken a myriad of forms in the prior art, but none combine low power transmitter operation, integral station identification messages, and a fixed installation such as at an airport. Many such instances of the prior art concern themselves with cellular phone operations, satellite operations, TV audio conversion, and general down conversion of electromagnetic signals. As listening to two way aircraft and air traffic control signals is obviously a simplex (one way) channel with respect to the listener (the spectator rightly cannot participate in any aircraft-ATC conversations), much of this prior art does not apply as it is concerned with duplex (two way) transmissions.

U.S. Pat. No. 5,812,086 to Bertiger et al. (1998) concerns retransmission (both simplex and duplex) of geo-location signals that involves calculation of a geographical location as well as an 'infrastructure transceiver apparatus' such as a satellite host. U.S. Pat. No. 5,784,028 to Corman (1998) is simplex, but focuses on geo-location to obstructed areas. U.S. Pat. No. 5,508,731, issued to Kohorn (1996) uses a plurality of 'remote receiving stations' to conduct gaming and evaluation of television programming, so is duplex, but is not low power, is not focused on re-broadcasting strictly for the listening enjoyment of the user, and does not store station identification in the claimed local memory. U.S. Pat. No. 5,434,565 issued to Simon et al. (1995) rebroadcasts aircraft weather information, but not on commercial frequencies (it uses the common air traffic frequencies or CTAF frequencies) and does not employ multiple low power transmitters. U.S. Pat. No. 5,265,024 issued to Crabill et al. (1993) is also similar in scope.

U.S. Pat. No. 4,905,303 issued to Johnson et al. (1990) consists of a small device to down convert the audio from television broadcasts to AM or FM frequencies, this device to be attached to the AM/FM receiver in question. This implementation is not a fixed, low power transmitter or set of spatially fixed low power transmitters, does not involve aircraft communications, contains no station identification, multiplexing, or other sophisticated capability, and has in recent years simply been superseded by FM tuners that extend up into the TV broadcast spectrum (at least for TV channels in the range of 2-10). U.S. Pat. No. 5,173,775 issued to Walker (1992) entails receiving and demodulating a television signal for re-broadcast in a possibly different modulation scheme, and is not low power. U.S. Pat. No. 5,418,577, issued to Bagley (1995) is for rebroadcast of TV audio on FM channels, as in a residence or small home theater. This issuance is presumably low power, but has no multiplicity of low power transmitters, requires no specialized receiver (only a television), has no station identification capability, no timer or multiplexer function for multiple channels, and does not deal explicitly with aircraft communications or AM modulation embodiments. U.S. Pat. No. 5,628,056, issued to Grysiewicz et al., is similar and contains transmission of TV audio to AM as well as FM receivers. Again, this invention is not explicitly low power, does not explicitly contain a plurality of low power transmitters, and does not receive specialized (non commercial band) transmissions or broadcast a station identification message.

U.S. Pat. No. 4,541,119, issued to Cooper et al. (1985) describes a low power AM transmitter that is used as a portable advertising and public awareness node placed in a portable sign. This patent also references some other instances of 'serial' or 'daisy chained' low power transmitters, but none are a plurality of spatially fixed low power transmitters, none involve aircraft communications (only radio or public awareness messages), none broadcast a station identification, and all are arcane in their technological implementation (transmitters spaced at 3 m intervals, signals to the low power transmitters conveyed by wires between low power transmitters and tape recorders, and the like).

Richardson discloses a duplex AM/FM rebroadcast system in U.S. Pat. No. 4,353,127 (1982), but this system is not explicitly low power and does not contain a plurality of low power transmitters, a storage area for station identification or other stored messages, a timer/multiplexer for considering multiple specialized frequencies, a specialized receiver, or an input mechanism for a storage area and recorded messages.

U.S. Pat. No. 5,867,794 issued to Hayes et al. (1999) is concerned with rebroadcast of portable (cellular) telephone audio to an automobile's AM/FM radio and thus is presumably low power but is implicitly confined to the region of the interior of a vehicle, since it is obviously undesirable to broadcast individual telephone conversations to the general public.

U.S. Pat. No. 6,725,035 to Jochim et al. (2002) is concerned with cellular telephone transmissions and rebroadcasts to aircraft, as is U.S. Pat. No. 6,650,898 (also to Jochim). U.S. Pat. No. 5,915,210 issued to Cameron et al. (1999) uses a plurality of transmitters and a plurality of carriers, but also incorporates satellite communications and is not explicitly low power. U.S. Pat. No. 5,726,786 to Heflinger (1998) uses a plurality of transmitters and receivers but concerns an all-optical network. U.S. Pat. No. 5,038,402 to Robbins is concerned with digital transmission and reception of high quality audio in the FM band, but aircraft communications are neither high quality nor digital in nature. This disclosure also does not involve low power transmission or a plurality of such low power transmitters.

U.S. Pat. No. 4,232,392 issued to French (1980) uses a plurality of similar transmitters to overcome distortion effects in systems where a receiver receives signals from two nearly equal power transmitters simultaneously. A feature of this patent is that the system transmits all messages at least twice—something that would obviously be detrimental for providing aircraft communications to spectators.

Various patents (U.S. Pat. Nos. 6,836,650; 6,813,485; 5,263,196) describe frequency down conversion (AM to FM, FM to AM, either to other types of modulation), which can be viable mechanisms for converting aircraft communications (which are AM or amplitude modulated) signals, but are ancillary to retransmission and are ultimately only a partial implementation of multiple steps required for providing aircraft communications to the public on commercial radio bands.

Simply put, the prior art does not contain a radio device that can legally, cost effectively, and capably broadcast aircraft communications to the general public on commercial radio bands. All are deficient in at least one of the following required features:
   a. a specialized receiver and antenna in a fixed location (at an airport);
   b. one or more low power transmitter(s) and antenna(s) in a fixed location, with sufficient signal coverage for the area that intended spectators will occupy;
   c. a periodic and repeatable means for identifying the frequency and location of the FCC Part 15 low power transmitters;
   d. a timer/multiplexer to prioritize specialized frequencies, cue the station identification message required by the FCC Part 15 low power rules at required intervals, and regulate other minor points of operation;
   e. a storage location for the station identification message and transmitter and receiver configuration parameters;
   f. and an input mechanism for entering and storing the station identification message, receiver and transmitter configuration parameters, and other control and sequencing data;
   g. sufficient signage to make the public aware of the capability to listen to aircraft communications on commercial bands.

SUMMARY

In accordance with one embodiment, a low power (FCC Part 15) radio device that also receives specialized (such as aircraft) communications and transmits these communications enabling users with ordinary AM/FM radios to listen to said communications.

FIGURES

FIG. 1 shows a block diagram of the internals of the preferred embodiment, illustrating the major components and their interconnections.

Figure 2:
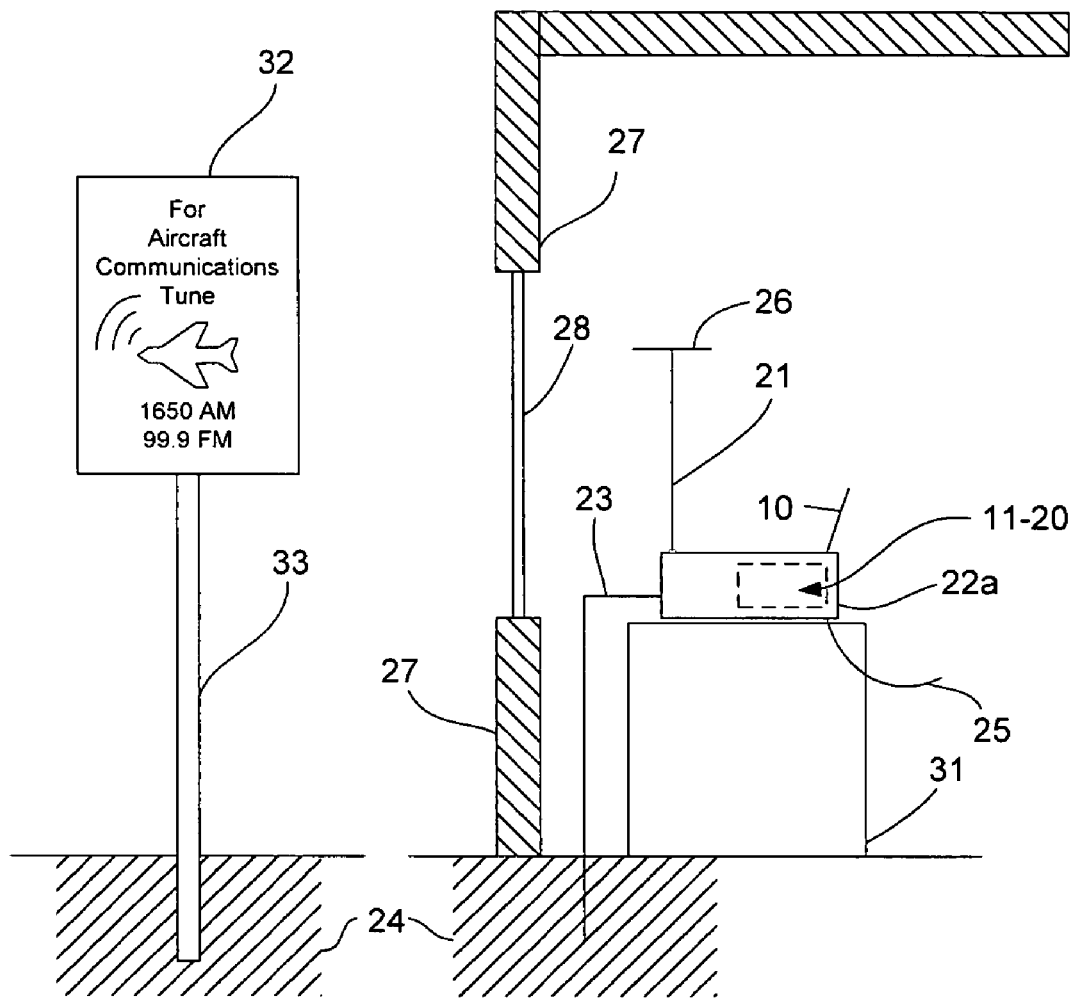
Figure 3:
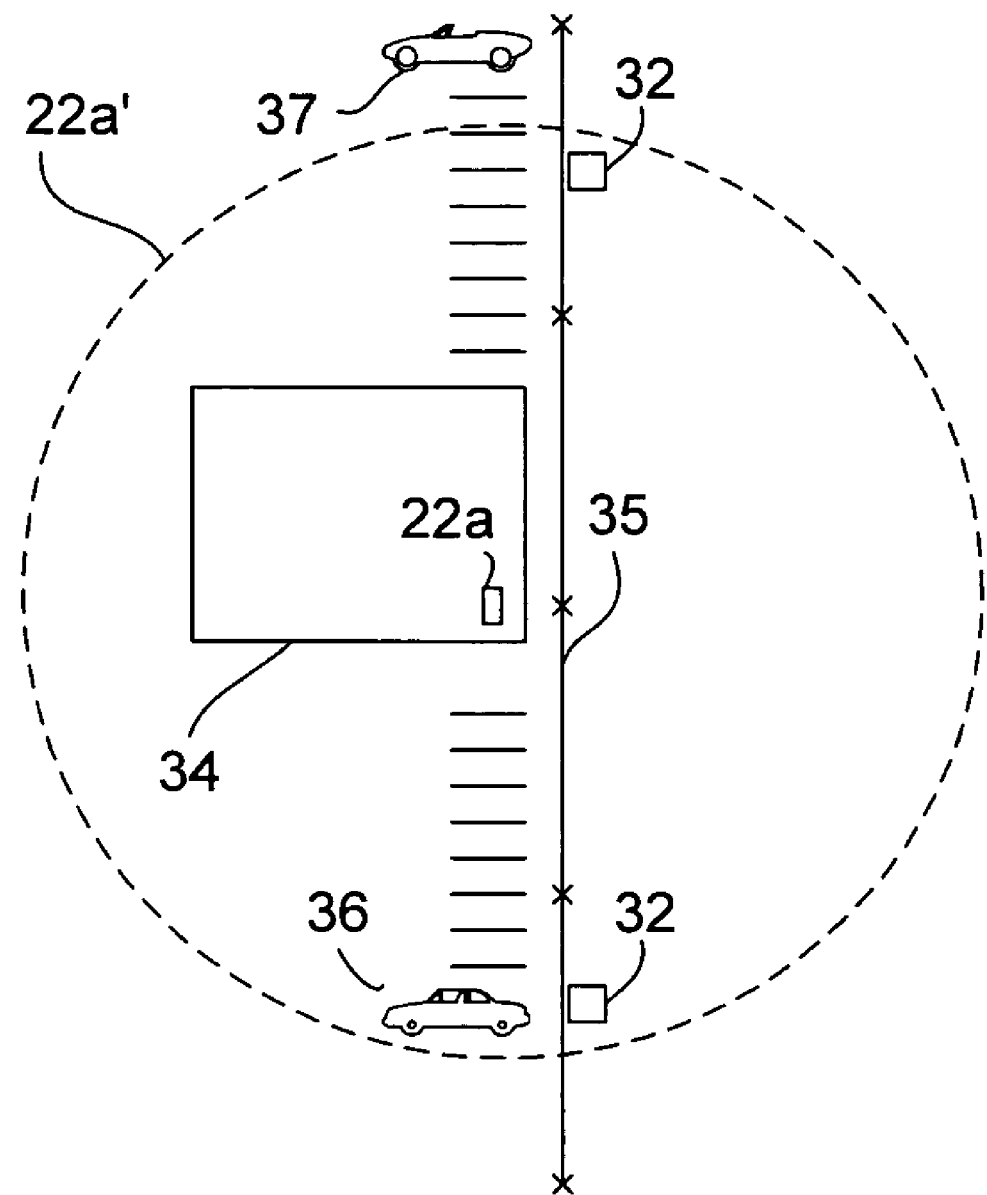
Figure 4:
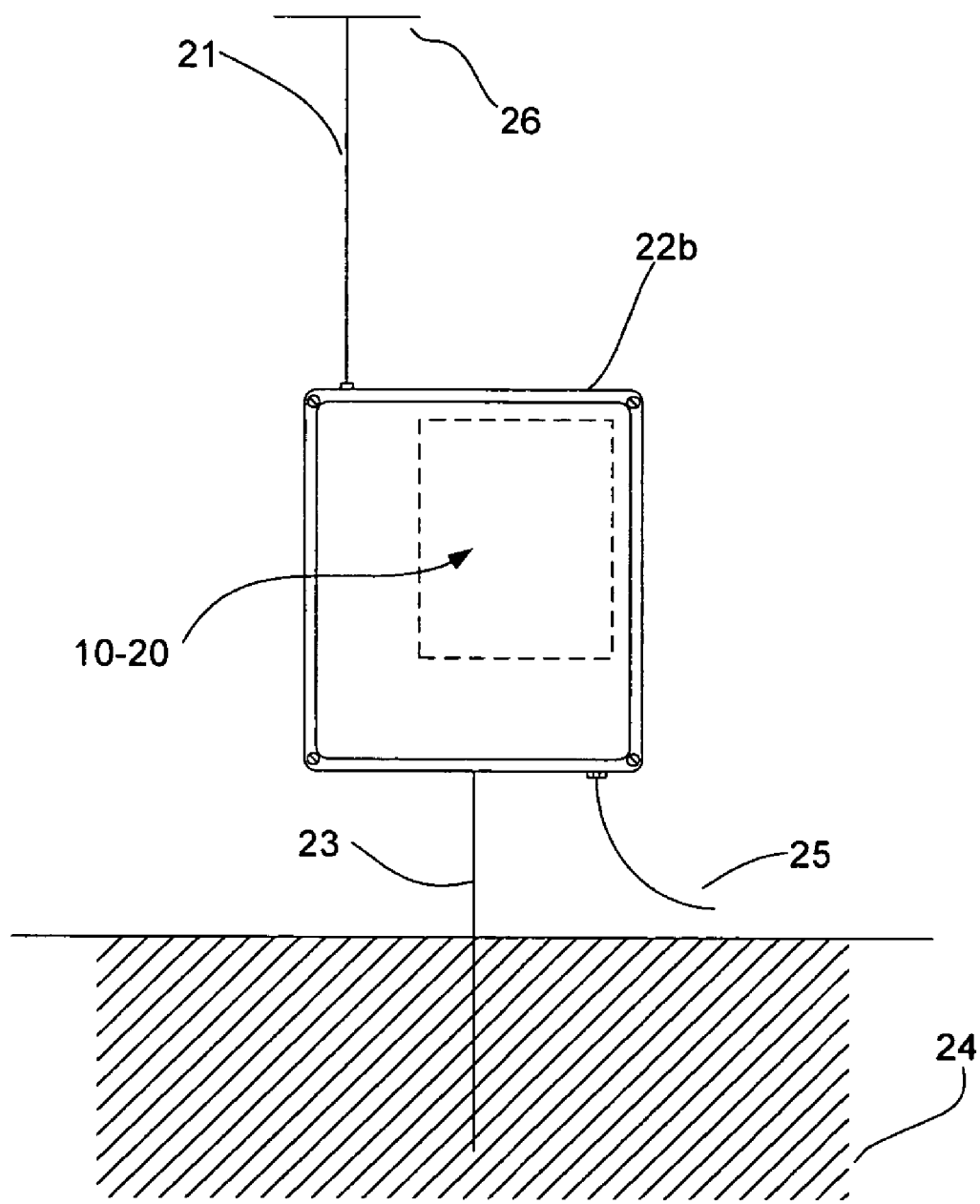
Figure 5:
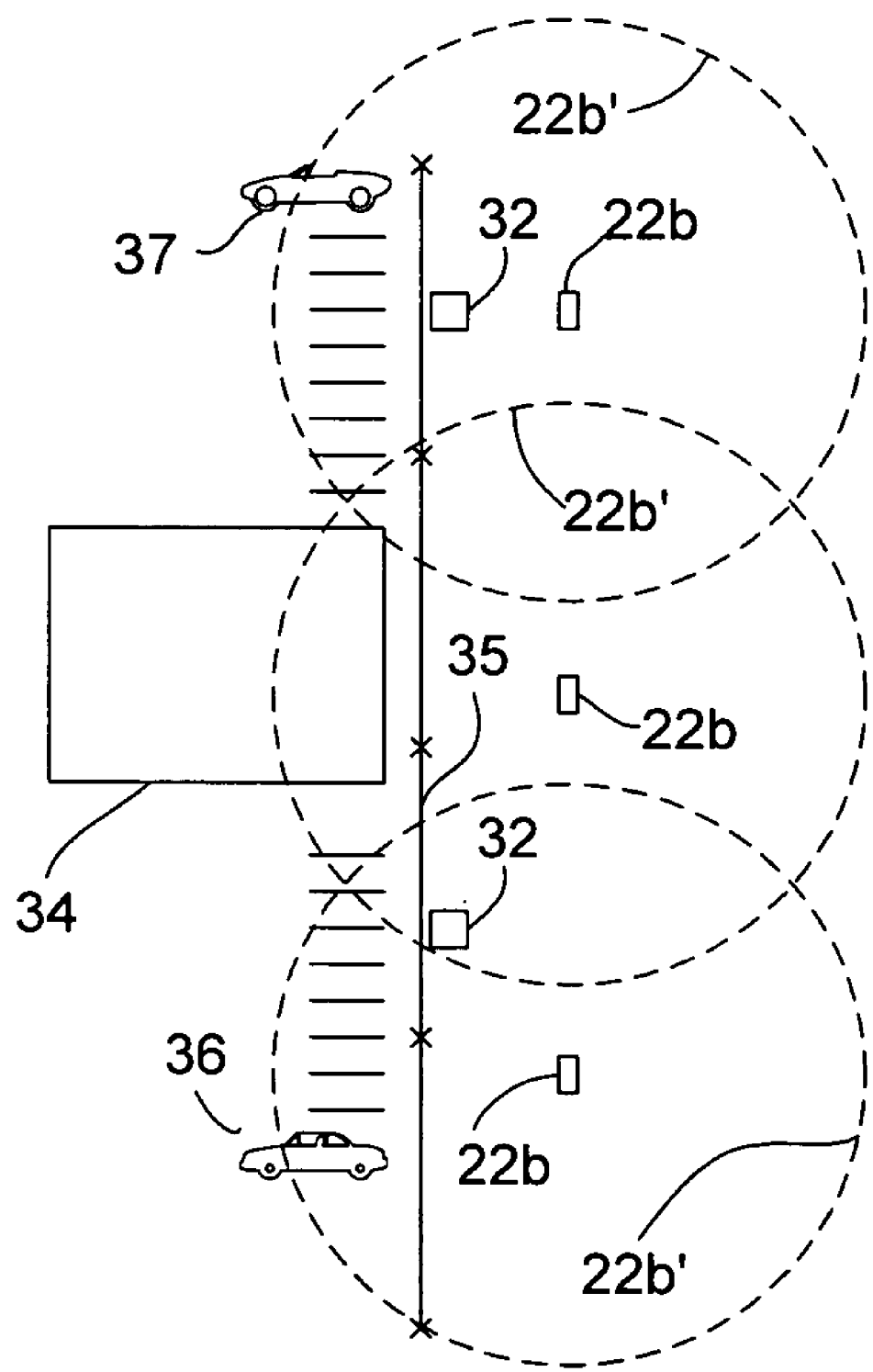
Figure 6:
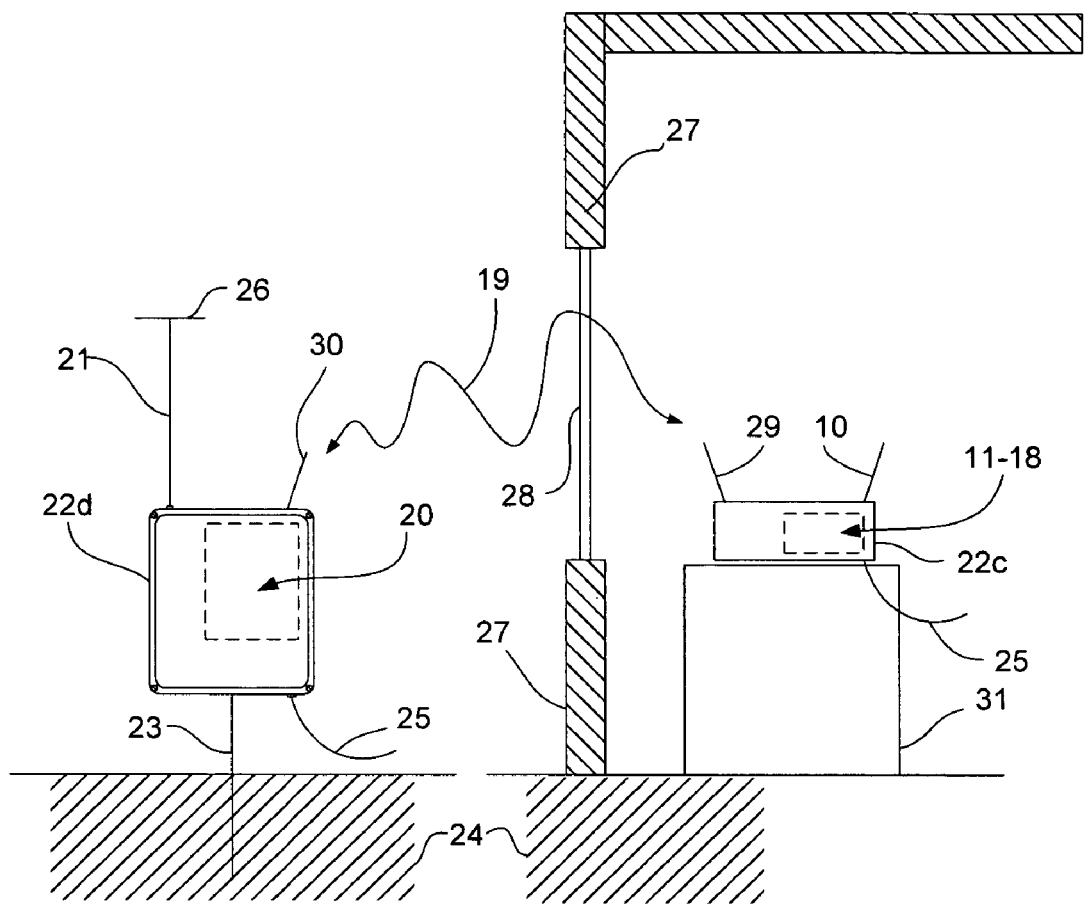
Figure 7:
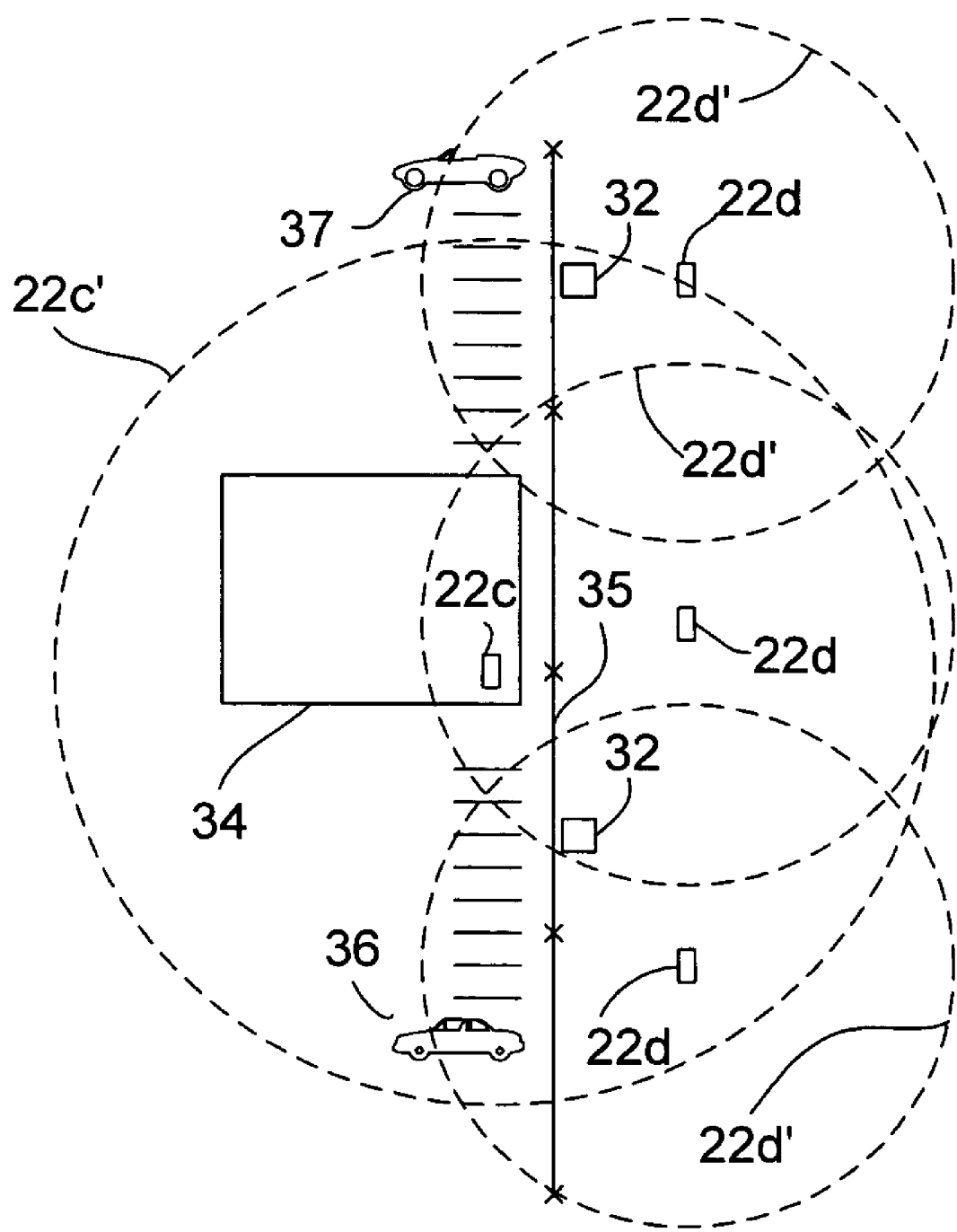

FIG. 2 shows an elevation view of an indoor embodiment.
FIG. 3 shows an aerial view of an indoor embodiment.
FIG. 4 shows an elevation view of an outdoor embodiment.
FIG. 5 shows an aerial view of an outdoor embodiment.
FIG. 6 shows an elevation view of an indoor/outdoor embodiment.
FIG. 7 shows an aerial view of an indoor/outdoor embodiment.

Reference Numerals

10 receiving antenna for specialized transmissions
11 specialized receiver
12 storage area
13 receiver control signal(s)
14 input mechanism for station identification, audio, data, configuration, and control
15 timer/multiplexer output signal(s)
16 timer/multiplexer
17 multiplexing switch
18 timer/multiplexer data and control signal(s)
19 transmitter control/data signals
20 low power transmitter
21 transmitter antenna
22*a* indoor embodiment
22*a'* range of embodiment 22*a*
22*b* outdoor embodiment
22*b'* range of embodiment 22*b*
22*c* indoor embodiment of reference numerals 11-18
22*c'* range of embodiment 22*c*
22*d* output embodiment of reference numeral 20
22*d'* range of embodiment 22*d*
23 combination electrical ground and support rod
24 earth (terra firma)
25 conventional power connection
26 conventional antenna enhancements
27 wall of structure
28 window of structure
29 conventional wireless frequency indoor antenna
30 conventional wireless frequency outdoor antenna
31 elevated, indoor flat surface
32 signage for advertising radio device
33 support for signage
34 building or structure
35 perimeter fence
36 spectator/user and automobile
37 spectator/user and automobile

DETAILED DESCRIPTION—FIGS 1-3—PREFERRED EMBODIMENT

In FIG. 1, receiving antenna 10 collects the specialized frequencies of interest and is connected to receiver 11. Receiver 11 can be digital, analog, or a combination of analog and digital; microprocessor based, software based, or soft radio based. Internal details of receiver 11 are well known to anyone familiar with the state of the art in radio reception. Receiver 11 converts signals from receiving antenna 10 into an intermediate form, either the actual representation in terms of audio, or an AM or FM signal that is suitable for immediate retransmission. The output of receiver 11 is connected to timer/multiplexer switch 17, and receiver 11 is connected via control signals 13, 15 to timer/multiplexer 16 and input mechanism 14. Timer/multiplexer 16 may be a digital machine such as a microprocessor, micro computer, computer, or simply an electronic RC (resistive-capacitive) based timing and switching device.

Input mechanism 14 is connected to and supplies data to storage area 12 via control and data signals 13. Input mechanism 14 is also connected to receiver 11 through storage 12, to timer/multiplexer 16, transmitter 20, and supplies data, configuration parameters, and control to these components also.

Input mechanism 14 may consist of a personal computer, PDA (personal digital assistant), wired or wireless link, cell phone, analog channel, digital channel, microphone, or any combination of the preceding. The data in storage 12 may be used by the low power (less than 100 mW) transmitter 20, or be used to configure specific parameters (such as frequency of operation or time interval) of the receiver 11, low power transmitter 20, or timer/multiplexer 16. Timer/multiplexer 16 is connected to and controls multiplexing switch 17 that multiplexes the signals from receiver 11 and the storage 12 using connected control signals 18. Control signals 13, 15, 18, and 19 can be used to sequence operation of receiver 11, low power transmitter 20, input mechanism 14, or to turn on or off any of these connected components.

Receiver 11 is connected to low power transmitter 20 via control and data signals 19. Signals 19 may be wired or wireless, analog or digital data. After a selection by timer/multiplexer 16, switch 17 has been positioned accordingly, and the selected signals 19 are sent to low power transmitter 20. Conventional low power transmitter 20 modulates (in the case of actual audio) and/or amplifies (in the case of an intermediate signal from receiver 11) the input data signals 19 to convert to LPAM (Low Power Amplitude Modulation) or LPFM (Low Power Frequency Modulation) levels. Antenna 21, connected to low power transmitter 20, radiates this signal to the user listening with his/her commercial band radio.

An indoor embodiment is shown in FIG. 2 housed in an enclosure 22a and placed in a suitable location such as on a flat surface 31 near wall 27 and window 28, with antenna 11 for receiving specialized signals and antenna 21 for transmitting on commercial bands positioned so that antenna 21 radiates outside structure 27, 34. The indoor embodiment is connected to power 25, consisting of conventional power sources such as alternating current (AC), direct current (DC) or batteries, solar cells, or any other sufficient power source known to the state of the art.

FIG. 3 shows an aerial view of the installation of an indoor embodiment. The low power transmitter of the indoor embodiment 22a has range 22a', and is installed inside structure or building 34. Spectators are apprised of the existence of the embodiment with signage 32 on signage support 33. Users 36 within range are able to listen to aircraft communications (or other specialized communications) on the side of perimeter fence or barrier 35. Users 37 out of range of embodiment 22a are unable to receive the signals from low power transmitter 20, the useful range of such transmitters being 30-300 m (100-1000 ft).

In the case of an AM version of the invention, antenna 21 is matched to the low power transmitter 20 with an appropriately sized loading coil, and incorporates conventional antenna enhancements 26 for increased radiation efficiency. For AM transmissions, enhancements 26 can be a capacitive top hat. For FM transmissions, enhancements 26 can also be applied to achieve the efficiency improvements well known in the literature, such a vertical dipole, ¼ wave, ⅝ wave collinear, log periodic, and other configurations.

Operation

The preferred embodiment is first set up by an operating person or persons (the operator), usually a Fixed Base Operator (FBO) at an airport. The operator first determines commercial frequency(ies) $f_T$ in the geographical area that are not already being used by local broadcast stations. These frequencies can be AM, FM or both. Determining unused or distantly used commercial frequencies adheres to the FCC Part 15 operating rules for low power transmitters.

The operator installs the invention indoors 22a (FIG. 2), outdoors 22b (FIG. 4), or with a combination of indoors and outdoors 22c and 22d (FIG. 6), and hangs or posts 33 signage 32 (FIG. 2) indicating the presence of the embodiment and the commercial transmission frequency(ies) $f_T$ being used.

The operator then turns the embodiment on using a switch or data supplied to timer/multiplexer 16 via input mechanism 14 in FIG. 1.

The operator next stores the specialized (aircraft communication) receiving frequencies $f_R$ to be multiplexed onto commercial band transmission frequencies $f_T$ using input mechanism 14 of FIG. 1. The operator assigns each of these frequencies $f_R$ a priority, from highest to lowest, or lowest to the highest employing input mechanism 14. Using these priorities and time, transmissions on the most important frequencies $f_R$ will be chosen over lesser priority frequencies by timer/multiplexer 16.

For example, timer/multiplexer 16 may thus prioritize frequencies from receiver 11 so a higher, more important frequency is selected unless it is not in use. In this case, the next lower priority signal is selected by timer/multiplexer 16 and sent to switch 17.

Using input mechanism 14, the operator then records station identification, public service, advertisement, or other audio or data, and this data is placed in storage 13.

During operation, timer/multiplexer 16 cycles through the aircraft frequencies of interest according to priority, order, time, or other criteria. Upon finding an active frequency from receiver 11, timer/multiplexer 16 positions switch 17 to pass the appropriate signal (either audio or directly transmissible modulated signal) to transmitter 20, using control signals 19. Receiver 11 and transmitter 20 may either or both contain appropriate and legal means for boosting the signals into and out of each. Antenna 21 then radiates the multiplexed aircraft (or other specialized) communications to the user (listener).

At appropriate times, timer/multiplexer 16 changes switch 17 to the proper position for a recorded station identification (identifying low power transmitter 20) message and retrieves this message from storage 12. The full or partial contents of storage 12 are transmitted as dictated by the operation of timer/multiplexer 16.

At specific or random intervals, timer/multiplexer 16 selects public service, advertising, or other data stored in storage area 12. In the case of aircraft communications, timer/multiplexer also periodically selects the Automated Weather Observation System (AWOS) signal (or similar signal) from receiver 11.

Note that if no channel being scanned is active, the timer/multiplexer may either continue to transmit the AM or FM carrier (no modulated audio) or may disable transmitter 20 to economize on power. At times entered by the operator via input mechanism 14, timer/multiplexer may also turn some (or all) of the components in FIG. 1 on or off to match a day/night or other time cycle.

In FIG. 3, users or spectators wishing to listen to the invention to hear the aircraft communications arrive at parking 36, 37 or building 34 with their commercial band receivers, or simply turn the car radio on. The user then tunes to the commercial frequency $f_T$ indicated on signage 32, and hears the aircraft communications on frequencies $f_R$ (multiplexed using the assigned priorities), as well as periodically or randomly any messages contained in storage 12.

Alternative Embodiments

FIG. 4 shows an elevation view of an outdoor installation which maximizes transmission range for a single instance of this embodiment, since no interposing structure 34 is present to attenuate the low power transmitter 20 signal. Components 11-20 of FIG. 1 are placed in a weatherproof outdoor enclosure 22b. The enclosure 22b is mechanically supported by ground rod 23 which is securely driven into the earth 24 and thus rod 23 also serves as the electrical ground connection. This installation method allows minimization of the grounding distance for the transmitter 20 circuitry and maximizes the possible length of antenna 21.

This outdoors embodiment thus allows maximum transmitted power and best radiation efficiency of low power transmitter 20 under the FCC Part 15 regulations that limit AM versions of the embodiment to 3 m of combined ground and antenna length and FM versions of the embodiment by actual radiated field strength measurements, since no interposing building structure exists that will attenuate the transmitted signal.

Conventional electrical power 25 (not shown) is supplied to the outdoor installation via AC, DC, battery, or an attached solar cell, the specific supply mechanism being the best suited for the specific installation.

FIG. 5 shows an aerial view of the outdoor installation where a plurality of embodiments 22b having overlapping ranges 22b'. Spectators and users arrive at parking 36, 37 or structure 34 and tune to the commercial frequencies shown on signage 32, positioned on or near perimeter fence 35.

FIG. 6 shows the indoor/outdoor installation for used for covering the most area with multiple copies of this embodiment. The components 11-18 of FIG. 1 are contained indoors in enclosure 22c. Enclosure 22d contains low power transmitter 20 and mounts low power transmitter antenna 21 of FIG. 1.

In the embodiment of FIG. 6, control and data signals 19 of FIG. 1 are now wireless signals. Because signals 19 are now wireless, the range between receiver embodiment 22c and any transmitter embodiment 22d can be upwards of miles. A plurality of low power AM or FM transmitters 22d can now be placed at will anywhere within the range of signals 18, and thus AM or FM coverage area is extremely large, even while still adhering to the FCC Part 15 low power transmitter regulations.

Indoor embodiment 22c sits on a flat surface, next to the window 28 of building or structure 27. Antenna 10 collects specialized (or aircraft) frequencies. Conventional wireless data antenna 29 transmits high frequency (such as in the 400 MHz or 900 MHz bands) control and data signals 18 to conventional wireless data receiving antenna 30 on transmitter embodiment 22d. Low power transmitter embodiment 22d then converts signals 18 and retransmits these signals on commercial AM or FM bands using antenna 21. A plurality of embodiments 22d with range 22d' are now placed within range 22c' of indoor embodiment 22c, and users and spectators positioned at 34, 36 and 37 have access to the low power transmitter 22d signals.

Operation

After a differing installation of an outdoor embodiment (FIG. 4) or indoor/outdoor embodiment (FIG. 6), the operation of these alternative embodiments as experienced by the operator and by the user is identical to the operation of the preferred embodiment of the FIGS. 1-3.

Advantages

From the prior description, numerous advantages of the described embodiments are evident:

a) Because the embodiments transmit on the commercial AM and FM bands, anyone with a portable, car, or personal radio can access and listen to specialized communications which normally are unavailable to listeners without specialized and expensive receivers.

b) Because the ability to receive specialized communications on common broadcast frequencies is immediately available and can be used spontaneously (spur of the moment desire to listen), barriers to participation (here in reference to aircraft communications) are removed which can generate interest and spur future participation in the activity (such as General Aviation).

c) Because the embodiments adhere to low power (<100 mW) transmission requirements under the FCC Part 15 low power rules, it does not need a costly station license.

d) Because the embodiments can be indoor, outdoor, and indoor/outdoor embodiments, the limitation on low power broadcasting (LPAM, low power AM, and LPFM, low power FM) can be overcome by positioning the transmitting portion of the invention outdoors to maximize range. These embodiments enable the maximum antenna length and maximum ground length allowed by the FCC, and can be positioned adjacent to viewing areas (again, such as next to a parking area with view of aircraft taxiway and runway operations).

e) Because the limitations on LPAM and LPFM can be overcome by positioning embodiments at desired locations, multiple instances of the invention can be placed at intervals to allow transmission coverage that is much greater than what is allowed under FCC Part 15 low power rules, while maintaining a legal transmit output power for each instance of the invention.

f) Because the embodiments can be envisioned in outdoor, indoor/outdoor, and indoor embodiments, the receiving portion of the embodiments can be placed either completely singly outside any structure, can accompany each transmitter in each instance of multiple copies of the invention, or can be singly installed indoors and communicate with one or more instances of low power transmitters placed outdoors to achieve the aforementioned increased coverage area and the decreased cost of only a single specialized receiver.

All of the above features lend themselves to installations of the embodiments that are both capable of covering a large area to serve a listening audience the best possible, as well as achieve low cost of the installation and operation.

Conclusion, Ramifications, and Scope

Accordingly, the reader will see that each of the embodiments provides users access to aircraft (or other specialized communications) without having to purchase specialized receivers or be aware of specialized frequencies. Because the embodiments incorporate low power (FCC Part 15) transmitters, the cost of providing such access is quite nominal and no expensive station licenses are required. Because of the aforementioned embodiments, the range limitations caused by power limitations and interposing structures can be overcome by outdoor or indoor/outdoor embodiments, each of these example embodiments having specific and distinct advantages of cost, ease of installation, coverage overlap, and number of installations.

Furthermore, in the case of aircraft communications, the embodiments have the additional advantages:

barriers to learning the language of air traffic control are removed as anyone with a car or personal radio can observe air traffic and correlate the sometimes abstruse and terse language with the viewed aircraft operations and actions;

the removal of this barrier encourages familiarity with air traffic control language, which allows pilots and prospective pilots a head start on learning the communications necessary for safe aircraft operations;

perceived barriers in radio communications due to trepidations over verbal mistakes and mis-spoken intentions are removed, as examples of such mistakes and remedies for such mistakes will become apparent through listening, and those uncomfortable with such radio communications will see others making and overcoming verbal mistakes;

persons familiar with student pilots and pilots will be able to listen for their relatives or friends and participate in and enjoy events like first solos, check rides, and arrivals and departures;

the perception of General Aviation as exclusive, expensive, and hard to reach is mitigated to listeners and spectators.

Although the prior description contains many specifications, it should not be construed as to limit the scope of any embodiment, but is intended as simply an illustration of possible or presently preferred embodiments.

For example, several specialized receivers 11 may be needed because of signal variations over a certain area or the desire to segregate specific receiving frequencies to specific listening areas. Low power transmitters 20 may also operate at several frequencies, based on available open bandwidth in the commercial spectrum and the desire to provide both AM and FM transmissions simultaneously.

Additionally, for indoor embodiments antennas 10 and 21 may be positioned, affixed, held, or otherwise located on or next to window 28 such that the signal received by antenna 10 and the signal radiated from antenna 21 are maximized.

For indoor/outdoor embodiments, the method of communication between the specialized receiver 22c and low power transmitter 22d may be different for different installations, portions of installations, or for other reasons. The method of communication between specialized receiver 22c and low power transmitter 22d illustrated as electronic (either wired or wireless), but also may be photonic (optical), digital, analog, or any other type of communications contemplated by the industry. Also in the case of an indoor/outdoor embodiment, conventional power 25 to the receiving and transmitting portions of the invention may be separate and distinct.

Thus the scope of the embodiment should be determined by the appended claims and their legal equivalents, rather than by the examples given.

What is claimed is:

1. A method of installation a radio device in a fixed location, comprising:
   (a) an antenna for receiving specialized transmissions outside the commercial (AM and FM) bands,
   (b) a specialized receiver for receiving and transforming said specialized transmissions that are outside of the commercial (AM and FM) bands,
   (c) a timer/multiplexer for selecting from a plurality of said transformed, received specialized transmissions and selecting a station identification message,
   (d) means for directing the operation of the timer/multiplexer, such as priority or time order,
   (e) a low power transmitter for transmitting on unoccupied portions of the commercial (AM and FM) bands,
   (f) an antenna with appropriate efficiency enhancements and interfacing suitable to connect to said low power transmitter,
   (g) a storage area for a station identification message, data, configuration parameters, and means for directing operation of the said timer/multiplexer,
   (h) an input mechanism, for inputting station identification, audio, data, and configuration parameters, and means for directing said timer/multiplexer into said storage area,
   (i) a multiplexing switch, controlled by said input mechanism and said timer/multiplexer, for effecting selections of said timer/multiplexer,
   (j) a conventional, controllable power source for said specialized receiver, said timer/multiplexer, said low power transmitter, said storage area, and said input mechanism, and said multiplexing switch,
   (k) a grounding connection that can also serve as a mechanical support while maximizing the usable length of said receiving antenna and said ground connection length, maximizing the signal radiated from said low power transmitter and said low power transmitter antenna,
   (l) sufficient signage to advertise the presence and capability of said radio device,
   (m) a plurality of control and data signals between the said specialized receiver, said low power transmitter, said timer/multiplexer, said input mechanism, and said storage area,
   (n) said receiving antenna being connected to said specialized receiver, said input mechanism being connected to said specialized receiver, said storage area, said timer/multiplexer, said multiplexing switch, and said transmitter through said storage area, said timer/multiplexer connected to said specialized receiver, said multiplexing switch, said storage area, and said low power transmitter by said plurality of control and data signals, said multiplexing switch connected to said specialized receiver, said low power transmitter, and said storage area, and said transmitting antenna connected to said low power transmitter,
   whereby said radio device can receive specialized transmissions, select between received transmissions, stored transmissions, or other data or transmissions, and retransmit said selected transmission using said low power transmitter on commercial frequencies under FCC Part 15 low power rules.

2. A method of installation of radio device of claim 1, wherein a fixed installation of a plurality, of said radio device exists both indoors and outdoors.

3. A method of installation of radio device of claim 1, wherein a fixed combination of indoor/outdoor installations of a plurality of said radio device exists, comprising said low power transmitter(s) and said low power transmitter antenna(s) installed outdoors and communicates with the remaining plurality of components of said radio device installed indoors, whereby said radio device exists in plurality such that the area covered by the low power transmitter contained in said device is maximized and attenuation of housing structures is minimized, and the largest number of users can be within the usable range of the said low power transmitters of said radio device.

* * * * *